US007335298B2

(12) United States Patent
Axelrod

(10) Patent No.: US 7,335,298 B2
(45) Date of Patent: Feb. 26, 2008

(54) MODULAR AQUARIUM FILTER

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 11/739,591

(22) Filed: Apr. 24, 2007

(65) Prior Publication Data
US 2007/0209986 A1 Sep. 13, 2007

Related U.S. Application Data

(63) Continuation of application No. 10/935,725, filed on Sep. 7, 2004, now Pat. No. 7,208,084.

(51) Int. Cl.
A01K 63/04 (2006.01)
B01D 29/56 (2006.01)
C02F 3/00 (2006.01)

(52) U.S. Cl. .................. 210/167.22; 210/167.25; 210/151; 210/201; 210/259; 119/260

(58) Field of Classification Search .............. 210/150, 210/151, 167.21, 167.22, 167.25, 198.1, 210/201, 259, 263, 416.1, 416.2; 119/259, 119/260
See application file for complete search history.

(56) References Cited
U.S. PATENT DOCUMENTS 2,354,645 A * 8/1944 Bateman ..................... 210/130
2,387,026 A * 10/1945 Huntington ................. 422/219
3,750,889 A * 8/1973 Acosta ..................... 210/497.01
3,973,519 A * 8/1976 McCarty et al. ............. 119/227
4,648,971 A * 3/1987 Pabst ......................... 210/354
5,006,246 A * 4/1991 Edwards et al. ............. 210/264
5,146,841 A * 9/1992 Zittel .......................... 99/348
5,217,606 A * 6/1993 Ramponi et al. ............ 210/136
5,466,384 A * 11/1995 Prevost et al. .............. 210/787
5,651,305 A * 7/1997 Bushman et al. ............. 99/510
6,294,090 B1 * 9/2001 Nussbaumer et al. ... 210/321.83
2004/0173520 A1 * 9/2004 Nguyen ...................... 210/440

FOREIGN PATENT DOCUMENTS

EP 0421261 * 4/1991

* cited by examiner

Primary Examiner—Fred G. Prince
(74) Attorney, Agent, or Firm—Grossman, Tucker, Perreault & Pfleger PLLC

(57) ABSTRACT

A modular aquarium filter includes one or more cartridges connected in series. The cartridges may contain filter media for chemical, biological and/or mechanical filtration. In addition, the cartridges are designed such that they provide a unique internal helical geometry to increase the contact area and flow rate of the water with the filter media. The helix may be optionally adjusted to provide different thickness filter layers for aquarium filtration. The pitch of the flights of the helix may be varied to provide enhanced centrifugal flow of the water within the cartridge. The present invention also provides self-sealing valve assemblies at the filter inlet and outlet, which when disconnected shut off the flow of water through the filter to expedite exchange of the cartridges.

19 Claims, 6 Drawing Sheets

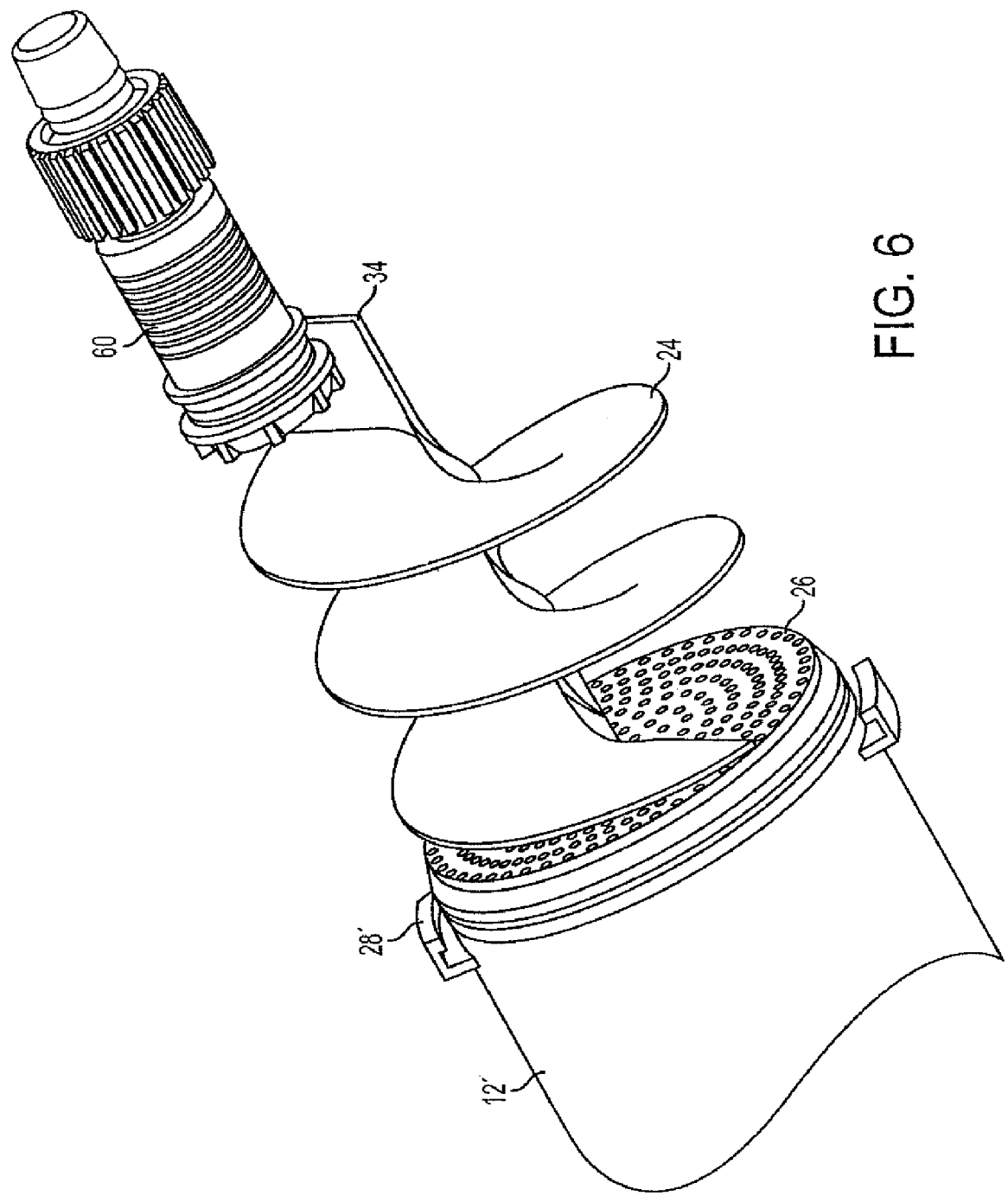

MODULAR AQUARIUM FILTER

CROSS REFERENCE TO RELATED APPLICATIONS

This application is a continuation of U.S. patent application Ser. No. 10/935,725, filed Sep. 7, 2004 (now U.S. Pat. No. 7,208,084) the teachings of which are incorporated herein by reference.

FIELD OF INVENTION

The present invention relates generally to an aquarium filter, and more particularly to a filter having one or more filter cartridges mounted in series and connected to self-sealing connectors. The cartridges individually and independently may provide biological, chemical and/or particulate filtering of the aquarium environment. Each cartridge includes a helical flow director and perforated platform for supporting filter media.

BACKGROUND OF THE INVENTION

Filters have been used in aquariums for many years to remove particulate matter from the aquarium water in order to keep the aquarium clean. Traditionally, the most common type of aquarium filter is a power filter which hangs on the outside of the aquarium over the top edge. It includes a siphon tube which carries water from the aquarium into a filter box. Water entering the filter box flows over various types of filter media to remove particulate matter from the water. The water passes through filter carbon to remove chemical impurities from the water which is then pumped back into the aquarium using a pump. Examples of such power filters include the Supreme Aqua King power filter marketed by E. G. Danner Manufacturing Co., the Second Nature Whisper power filter marketed by Willinger Bros. Mfg. Co., and the Aqua Clear power filter marketed by Rolf Hagen Manufacturing Co.

Another type of aquarium filter is a canister type filter which may be positioned outside and below the aquarium. Intake and output hoses hang over the aquarium edge and are connected to the canister filter on the floor. Water is fed by gravity through the intake hose from the aquarium to the canister. The aquarium water is both mechanically and chemically treated and pumped back into the aquarium by a pump contained in the canister. Examples of canister type filters include the Hagen Fluval filter marketed by Hagen USA Mfg., Co., Marine Land Canister Filter marketed by Aquaria, Inc., and Eheim Classic Canister Filters, marketed by Eheim GmbH & Co. KG.

An internally mounted power filter is still another type of aquarium filter. Such a filter comprises a small canister with a built-in pump which is submerged inside the aquarium. Water enters the bottom of the canister and flows through a filter sleeve which removes particulate and chemical waste. The filtered water is then pumped out the top of the canister and back into the aquarium. Examples of this type of filter are the Supreme Ovation internal filter marketed by Danner Mfg. and the Hagen Fluval internal filter sold by Hagen USA Mfg. Co.

Still another type of filter employed in aquariums is the undergravel filter which consists of a perforated raised plate which rests on the aquarium floor. Riser tubes are provided on either end of the filter and extend into the top of the aquarium. Gravel is placed on top of the plate to a thickness of about 2 inches. Air lines from an external pump are placed in the riser tubes to the bottom plate and an air stone is placed at the end of the air lines. Air is forced by the pump through the air stones thereby forcing air bubbles to travel up through the tubes to the water surface creating turbulence or current. Water is then pulled through the gravel and forced up the riser tubes. Waste from the aquarium is drawn through the gravel bed where bacteria break down any ammonia or nitrites to less harmful nitrates. A biological filter does not, however, remove all chemical wastes. Examples of such undergravel filters include filters marketed by Perfecto Mfg. and Penplex Mfg.

Yet another type of prior art filter commonly used in aquariums is a wet/dry trickle type filter which includes a skimmer box that hangs inside the aquarium at the top. Siphon tubes are provided for carrying water from the aquarium to a prefilter which is mounted directly behind the skimmer box on the outside of the aquarium. Water passes through foam sleeves in a pre-filter to trap particulate matter. The water then travels through the hose in a tank typically positioned beneath the aquarium. As water enters the tank beneath the aquarium, it flows onto a drip plate or spray bar in a dry chamber of filters which contains a plurality of plastic biospheres. Water drips over and through the biospheres to the bottom section of the tank. Bacteria colonies grow on all biospheres which feed on waste products in the water passing over them. From there, the water gathers in the bottom of the filter tank and then passes through a carbon filter or other filter to remove chemical wastes from the water. The water is then passed through dolomite, crushed coral or crushed clam shells to buffer the water which is then pumped through the return hose back to the aquarium. Wet/dry filters can include mechanical, chemical and biological filters. Examples of such filters are the Plus Series trickle filter marketed by Oceanic System, Inc. and the Perfecto Wet/Dry filtration system sold by Perfecto Mfg. Co.

Wet/dry filters may also be built into the aquarium and form a permanent part of the tank. One such wet/dry filter that is permanently built into the tank is marketed by Tenecor Corporation of Tempe, Ariz.

An alternative form of the wet/dry filter is an internally mounted wet/dry filter which includes an integrated pump and heater for small aquariums. The filter is placed inside the aquarium against the rear wall with the top of the filter at the water level. Water enters the filter and then passes through the filter cartridge which removes particulate and chemical waste materials. A portion of the water is then pumped into a drip plate in a dry chamber for biological filtration. The remaining water is then pumped directly back into the aquarium so as to bypass the dry area. One such filter is marketed by Rolf Hagen Mfg. under the trademark "Biolife" filter.

As should be clear from the above, proper and continuous filtration is critical to keeping happy, healthy fish, and there are three basic filtration methods: mechanical, biological and chemical. However, one long-standing problem is, e.g., that while freshly charged filter media accomplish their intended goals, over time, they tend to loose efficiency.

For example, mechanical filtration media, the means by which large particles of excess food and other debris are removed, screened, or skimmed from the water, may become clogged over time, reducing their ability to function as intended. Chemical filtration uses activated carbon and ammonia absorbents, such as zeolite, to remove odor, colors and harmful substances, such as ammonia, from the water. However, activated carbon will also loose its effectiveness over time and will similarly need replacement.

In addition, while replacement of mechanical and chemical filtration is ultimately necessary, careful attention must be placed upon the primary means of removing ammonia and nitrites (by-products of fish waste), which is the biological filter. A well-established aquarium is a natural ecosystem in which fish and the beneficial bacteria that naturally occur in an aquarium depend upon each other to live happily and healthy. The result of this interrelationship is commonly referred to as the "Nitrogen Cycle". Fish eat and produce ammonia as a waste product. Excess food and plant materials also decay and produce ammonia. Beneficial bacteria (aerobic) neutralize the ammonia and produce nitrites, which in turn are neutralized by other beneficial bacteria that produce nitrates. Nitrates in normal levels are harmless to freshwater fish, and over time, can be readily removed from the aquarium by partial water changes. Thus, the natural system in an aquarium converts toxic ammonia into harmless nitrates; all without chemicals or consumer assistance.

Expanding upon the above, there clearly needs to be a place for the aerobic bacteria to foster and grow within the filter system. It turns out that bacteria will grow on any porous surface in the filter assembly, e.g., on the media in a canister filter that pumps a steady flow of water for the bacteria to survive. That is, the water must be oxygenated as the aerobic bacteria require oxygen to reproduce and grow. An aquarium with proper aeration of the water and good water flow over the beneficial bacteria will provide sufficient oxygen to maintain the beneficial aerobic bacteria. And, of course, there must be a source of food (ammonia) for the bacteria. Any tank with fish or plants will provide sufficient food. The filtration system then circulates the ammonia carrying water over the beneficial bacteria for them to eat.

Once established, the bacteria inside the canister filter assembly are clearly invaluable and critical for a successful aquarium. However, as noted, the need to remove and regularly exchange portions of the chemical and mechanical media is also necessary. However, when exchanging mechanical and chemical media, it is important to do so in a manner that would not totally disrupt the biological filter media, which could lead to catastrophic results.

That being the case, aquarium filtration technology has not yet developed a modular filter system that would allow the hobbyist a convenient way to exchange filter media in a rapid fashion such that any disruption of water flow is of little consequence. More specifically, aquarium filtration technology has not yet provided a cartridge filter assembly comprising one or a plurality of cartridges that could each be conveniently removed and exchanged for new media with minimal impact on the biological filter bed and without the hobbyist getting wet in the process.

That being the case, there is a need for an aquarium filter which includes a series of cartridges that are easy to access and change such that water flow is suspended for only a short time.

In addition, it is important that such filters are efficient and preferably provide a tortuous flow path along with sufficient residence time for the media to act upon the water.

U.S. Pat. No. 5,866,018, entitled "Vortex Aquarium Filter", assigned to The Hartz Mountain Corporation is directed at an aquarium filter which can remove particles from aquarium water without the need for physical entrapment elements, comprising a first chamber having an annular wall and top and bottom, an inlet near the top of the first chamber positioned to create a vortex, an overflow outlet and a waste outlet. This reference appears to be directed at the removal of particulates by creating a vortex and illustrates in FIG. 1 chemical and biological filters which are separated from the claimed device. U.S. Pat. No. 5,830,360, entitled "Pour Though And Pitcher Mounted Water Filter For Removal Of Parasite Cysts, Bacteria And Viruses, And Method Of Filtering Water", is directed at a gravity fed, pour-through water filtration device including a chamber housing a spiral filter.

U.S. Pat. No. 5,643,470, entitled "Centrifugal Flow Separator" is directed at a method for separating the constituents of a fluid comprising impeding the flow of the fluid to cause the fluid to move in a curvilinear path. A housing comprises an interior and an exterior chamber separated by a conical baffle which decreases in volume from a first end to a second end. Flow enters the exterior chamber and is impeded by striking the conical baffle, causing the fluid to move in a curvilinear path such that the fluid is affected by centrifugal forces which enhance the separation of the fluid ingredients. Subsequently, the fluid moves to a portion of the exterior chamber having increased volume to further enhance separation.

U.S. Pat. No. 5,030,349, entitled "Filter Apparatus" is directed at a fluid filter having a filter element including at least one group of disk-like elements, including at least an element of relatively fine porous material, having disposed on both sides thereof disk-like elements of a relatively coarse porous material each of the at least one group having disposed on both sides thereof a grooved spacer element.

U.S. Pat. No. 4,978,450, entitled "Filtering Element" is directed at a stack of discs comprising a plurality of co-operating filter elements having a first surface defining spaced circumferentially extending raised line portions separated by grooves and a second surface defining a plurality of radially extending fingers which communicate with the upstream and downstream sides of the stack.

U.S. Pat. No. 4,597,871, entitled "Apparatus For Removing Foreign Matters", to Hitachi Ltd., is directed at a cylindrical housing, a radial inlet pipe mounted on an upper portion of the housing and an axial outlet pipe mounted on the lower portion of the housing. A conical filter is disposed therebetween. A deflector is mounted at the outlet of the inlet pipe to deflect the liquid so as to swirl it around the filter. Foreign matter is deposited on the filter, and condensed by centrifugal force and downward movement of the liquid.

U.S. Pat. No. 4,267,042, entitled "Water Filter, In Particular For Aquarium Water", is directed at a filter chamber having an inlet and outlet and filled with exchangeable filter material. The filter chamber is defined by an annular space between two concentric tubes of different diameters. The outer tube of the filter cartridge may be formed as a corrugated tube with helical corrugations. This produces a flow pattern so that the water to be purified flows to those filter regions in which the filter material is least clogged. Both inner and outer tubes are perforated and the outer tube is encased by a shell of water permeable foam.

As can be seen, there exists a need for an aquarium filter which provides a series of canisters which may be easily attached together for biological, chemical and mechanical filtering, which provides efficient filtration and which may be exchanged in a short time period so as not to upset the balance in the aquarium.

Accordingly, it is an object of this invention to provide a filter system that can be mounted to or near the aquarium that has one or more particulate, biological and/or chemical filter cartridges that can easily be replaced. It is also an object of the invention to provide a filter system that allows the user to rapidly replace any of the filter cartridges with minimal disruption of flow, without repriming the system when completed, and without getting wet in the process.

Accordingly, it is an object of the present invention to provide a modular aquarium filter comprising one or more filter cartridges that may easily be connected together to form a modular filter and which may be readily disconnected to change the filter media.

It is a further object of the present invention to provide a modular aquarium filter where cartridges for biological, chemical and mechanical filters may be linked in series for ease of access and exchange.

It is still further object of the present invention to provide a filter cartridge which includes a helical flow element which improves filtering efficiency by causing the water to flow in a centrifugal fashion.

It is still further object of the present invention to provide self-sealing valving at both the inlet and outlet of the filter to expedite exchange of the cartridges without the hobbyist getting wet.

SUMMARY OF THE INVENTION

A modular aquarium filter comprising one or more cartridges connected in series, wherein said one or more cartridges each have a top end and a bottom end, wherein one or more cartridges includes an inlet at said top end and an endplate including an outlet, wherein one or more of said cartridges has a bottom end closed off by said endplate, and wherein said one or more cylindrical cartridges contains a helical flow director.

A device for directing the flow of water through a filter, the filter including one or more housings connected in series, each housing including a first end and a second end, the filter further including an inlet at one end and an outlet at the other end, the device comprising a helical flow director disposed in any one of said housings. The helical flow director comprises a coil of material disposed axially in spiral fashion from said first end of said housing to said second end of said housing to impart centrifugal force upon fluid passing from said filter inlet to said filter outlet.

In method form, the present invention comprises a method for directing the flow of water through a filter, wherein said flow of water is directed by a helical flow director, and wherein the method allows the use of such filter for aquarium filtration wherein the filter can be readily exchanged without significant disruption of water flow.

BRIEF DESCRIPTION OF THE DRAWINGS

These and other objects, features and advantages of the present invention will become apparent by reference to the following description when considered in conjunction with the accompanying drawings, wherein:

FIG. 6 is a partial perspective view of the filter shown in FIG. 2 with the top cartridge removed for clarity.

DETAILED DESCRIPTION OF THE INVENTION

The present invention now is described more fully hereinafter with reference to the accompanying drawings, in which preferred embodiments of the invention are shown. This invention, may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
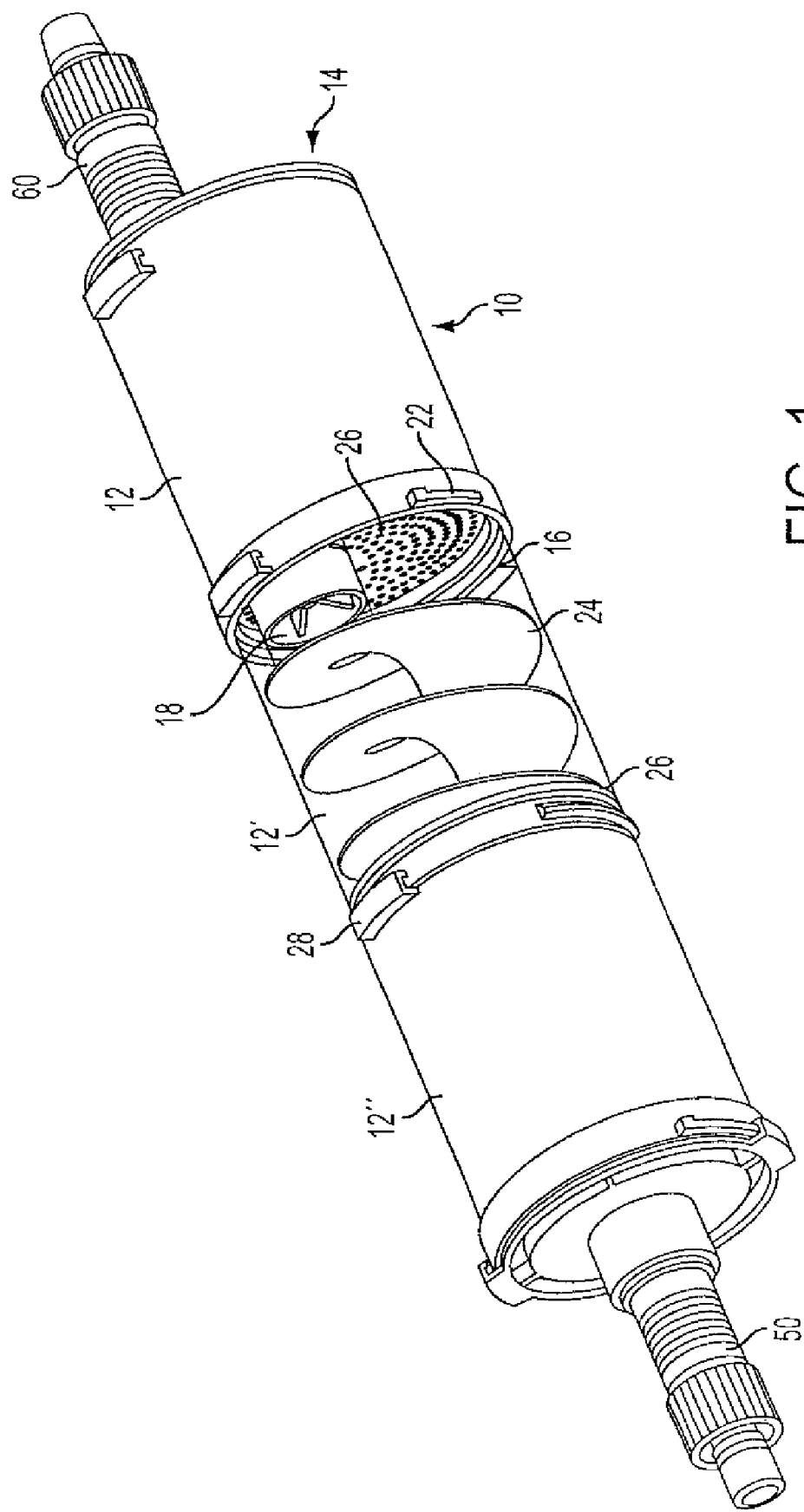
FIG. 1 is a perspective view of the modular filter of the present invention.

As shown in FIG. 1, the aquarium filter 10 of the present invention comprises a plurality of cylindrical cartridges 12, 12', 12" that may be connected in series to provide a modular assembly capable of providing one or a combination of biological, chemical or mechanical treatment of aquarium water. The filter 10 further includes a first connector 60 connected to a supply of water and a second connector 50 connected to a return line to direct the flow of water through the filter 10 from an aquarium, preferably supplied by a pump (not shown). In FIG. 1, a section of the wall of the middle of the three cylindrical cartridges 12' has been removed to illustrate the components of the filter which are housed inside.

Each cylindrical cartridge 12, 12', 12" comprises a top 14, an outer wall 16 and attachment features 22 and 28 which cooperate to allow frictional engagement of one cartridge to the next to provide a modular stacking. As further shown by the sectioned cartridge 12' in FIG. 1, each cartridge 12, 12', 12" include an outlet 18, a helical flow director 24 and a foraminous or perforated platform or substrate 26 for holding the filter media (not shown).

Figure 3:
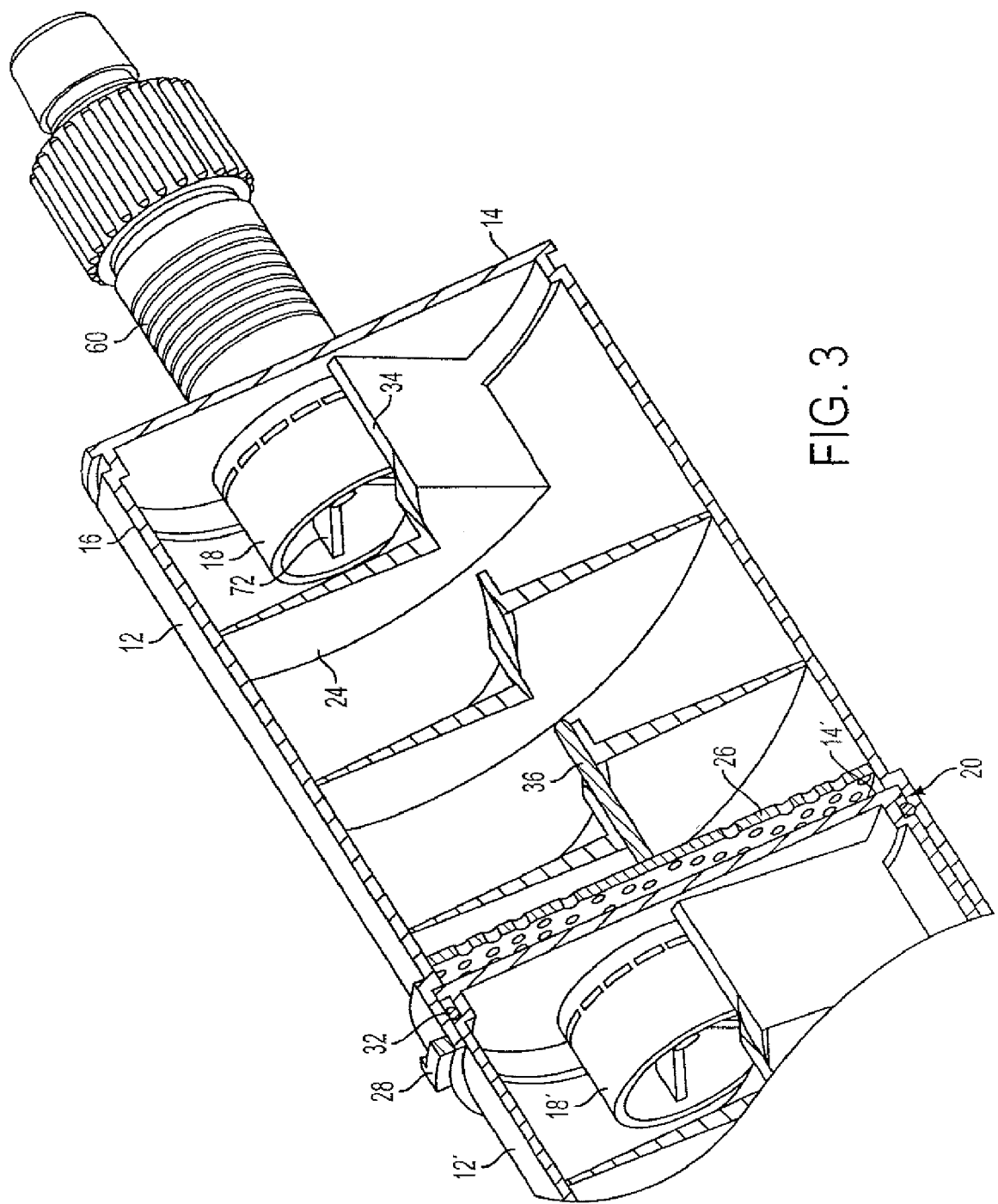
FIG. 3 is an enlarged sectional view of the top cartridge of the filter shown in FIG. 2.

The attachment of each cylindrical cartridge 12 to the next cartridge in series is accomplished as shown in FIG. 3 by inserting the top 14' of the second cartridge 12' into the open bottom 20 of the first cartridge 12 and rotating either cartridge relative to the other such that the cartridges 12, 12' are frictionally engaged. Upon rotating one cartridge relative to the other, an L-shaped projection 22 (see FIGS. 1 and 3) disposed preferably circumferentially on the outer surface of cartridge 12 slides under a mating J-shaped tab 28 (see FIGS. 1 and 6) disposed generally axially on the surface of the second cartridge 12' to pull the cartridges 12, 12' tightly together and frictionally engage them. An o-ring 32 is preferably inserted in a groove near the top 14' of the second cartridge 12' to provide a water-tight seal against the inner surface of the bottom of the first cartridge 12 (see FIG. 3). Other means of connecting the cartridges are possible including, but not limited to, the use of mating threads on the inner circumference of the bottom end 20 of cartridge 12 which frictionally engage with similar threads disposed on the outer circumference near the top 14' of cartridge 12', or the use of mechanical fasteners such as set screws.

Figure 2:
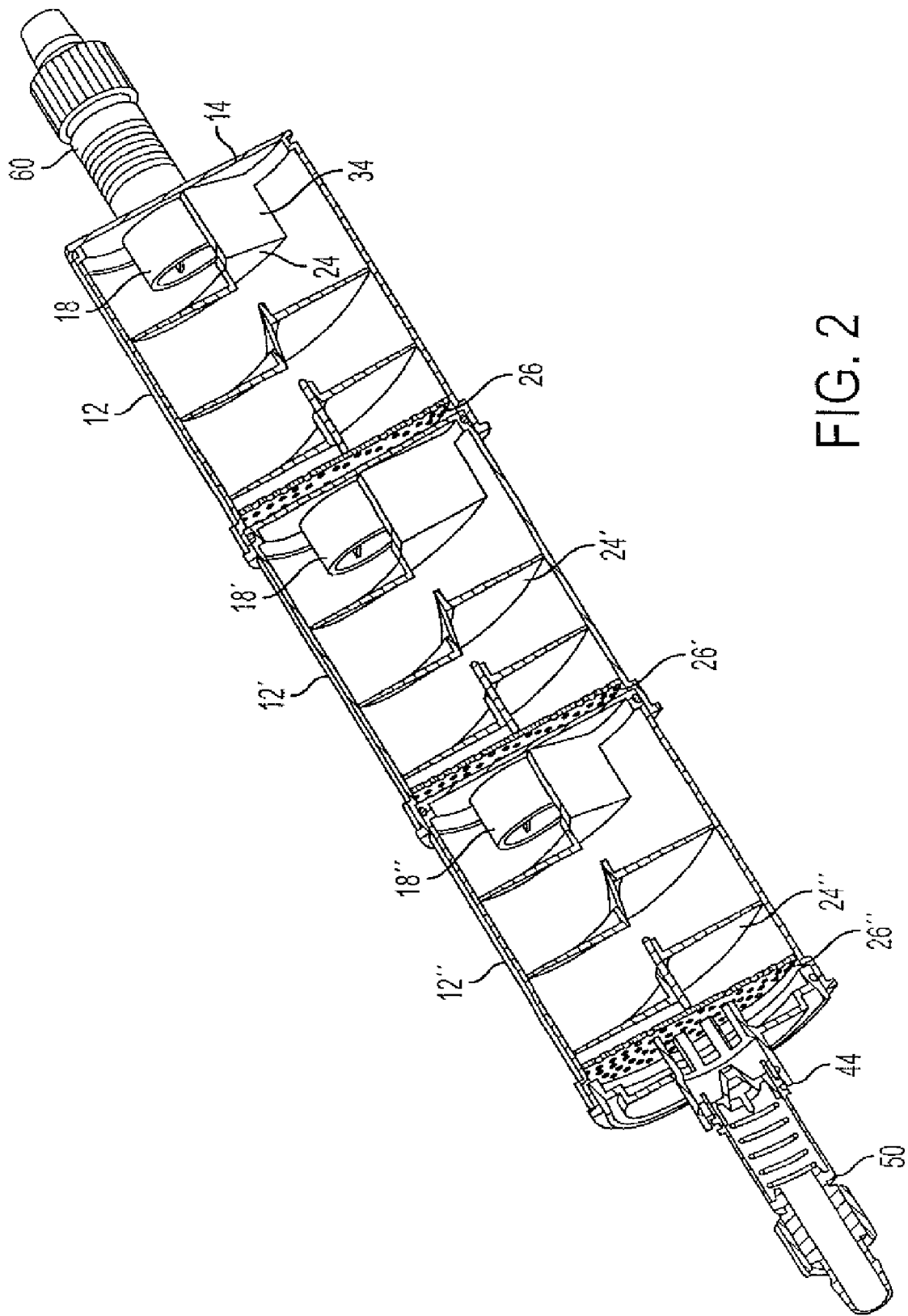
FIG. 2 is a sectional view of the filter of FIG. 1.

FIG. 2 is a sectional view through the center of the filter 10 illustrating how each of the cartridges 12, 12', 12' are stacked in series to provide filtering of water as it flows through from feed connector 60 to outlet connector 50.

FIG. 3 provides additional detail about the components which reside within each cartridge to make up the filter of the present invention. As shown in sectional view, each cartridge 12, includes a helical flow director 24 which causes the flow of water entering through the inlet 18 to be directed through the cartridge in a centrifugal fashion and through the perforated or foraminous platform 26 which also supports the media (not shown). The inlet 18 is preferably located nearer the wall 16 of the cylinder 12 rather than at the center of the top 14 to urge the water to flow along the helical flow director 24. In addition, a wall 34 preferably extends form the upper end of the helical flow director 24 towards the top 14 of the cartridge 12 to direct the entering flow of water down the helical flow director 24.

The helical flow director herein provides advantages by, among other things, offering an improved flow path and residence time, and relatively increased exposure of the water to the filter media. In addition, the filter media may be more efficiently packed, and customized at selected locations, and the helical flow director provides a centrifugal path for water flow.

The number of flights or turns that the helix makes inside the cartridge may be varied between cartridges or even within a cartridge. This is known as the pitch of the helix. For instance, in a biological filter one may desire a flow pattern that is not subjected to as much centrifugal force as in a mechanical filter, thus fewer flights or turns may be used. It may further be desirable to increase the centrifugal forces acting within a filter cartridge, say a mechanical filter, to separate out particulate matter, in which case the bottom portion of the helix may be more tightly wound than at the top where the water enters, to encourage separation. Thus, the distance between flights would decrease or the pitch of the helix may increase over the length of the cartridge 12.

As shown in FIG. 3, the helical flow director 24 is centrally located within the cartridge 12 by a rod 36 that extends upward from the perforated platform 26. The perforated platform is positioned slightly above the open end 20 of the cartridge 12 to allow water to flow through the perforations and through the inlet 18' of the second cartridge 12'. The perforated platform 26 provides a base or substrate which locates and supports the filter media which provides filtering or water treatment in each cartridge.

The media may be different for each cartridge which then provides a single modular filter unit, which may accomplish all of the filtering needs of an aquarium in one compact filter which is easy to access and change. The media may be preferably supplied in porous or woven bags to control its movement and the bags placed between the perforated platform 26 and the bottom end of the helical flow director 24. It is further contemplated that the media may extend at least part way up the helical flow director 24 or even be supplied in a correspondingly helical shape. This provides additional control of the residence time for the water to contact the media.

The media may be any filter media useful in the filtration or treatment of aquarium water, including but not limited to, ceramic rings, biospheres, dolomite, crushed coral, crushed clam shells and like biological media which enhance ammonia and nitrite reduction; activated charcoal, zeolite and like absorbants for the absorption of odors and impurities; and foam, glass wool and like porous constructions for removing dirt and debris.

A further advantage of the modular filter comprising the present invention is that each cartridge can be supplied to the hobbyist precharged with the respective media packaged inside. The used or spent cartridge may be returned to the aquarium supply store for recharging with fresh media. Thus, there is no need for the hobbyist to come in contact with the media. In addition, since each filter type has its own schedule for changing, and since it may be preferred not to change all three filters at once and upset the eco-balance of the aquarium, any single cartridge can be exchanged quickly and easily by disengaging the water supply and drain lines and disengaging the cartridges one from the other.

The various components of the modular filter which comprises the present invention are preferably molded of plastic. This provides high volume production of replicate shapes at reasonable cost. Further, plastic can be molded with a smooth surface and is relatively inert to the chemicals used in an aquarium so that impurities and bacteria do accumulate on the surfaces.

Figure 4:
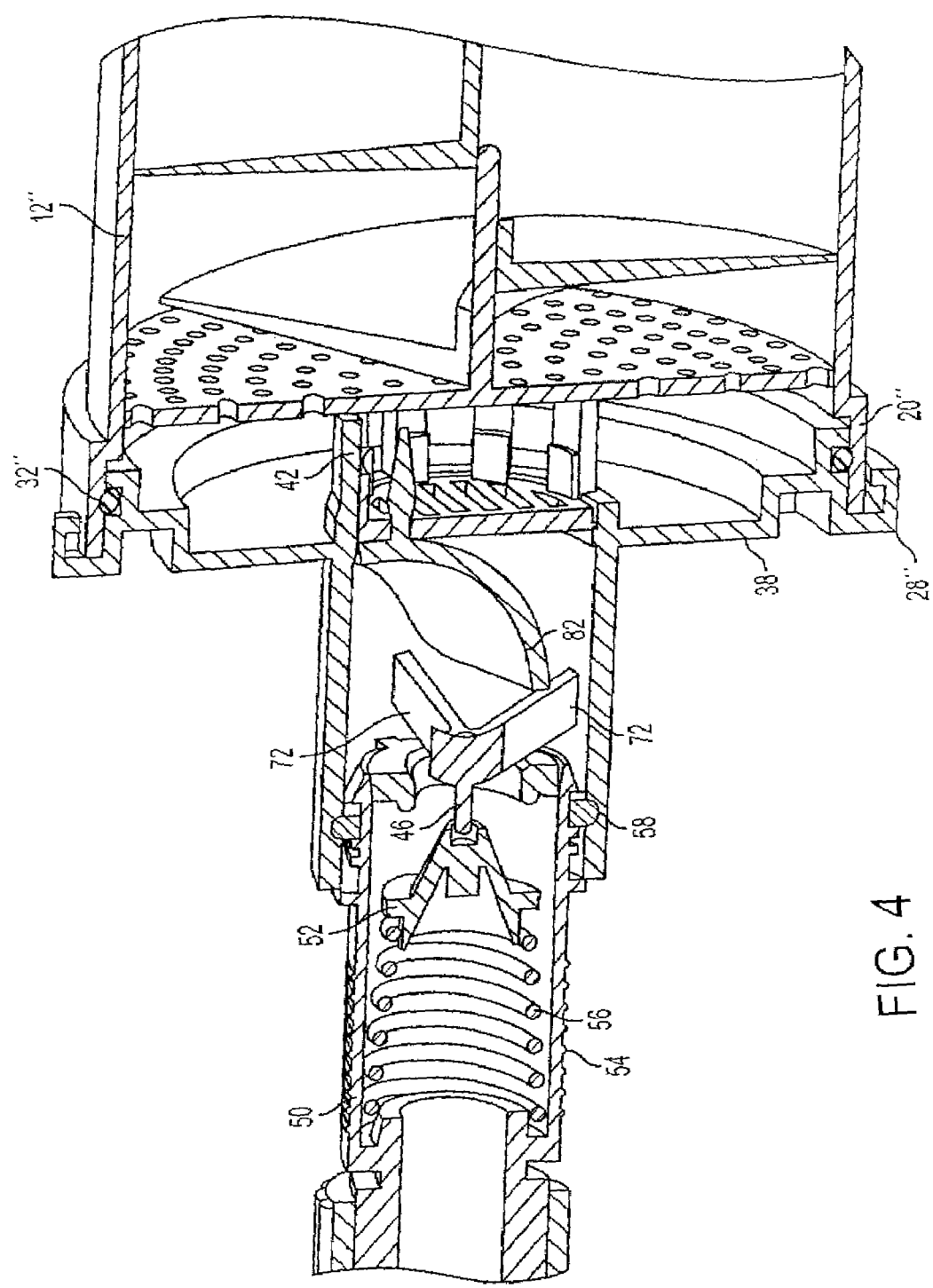
FIG. 4 is an enlarged sectional view of the bottom cartridge of the filter shown in FIG. 2.

Turning to FIG. 4, an end plate 38 for the last filter cartridge of the series connected in line is shown. As described above for cartridges 12 and 12', the last filter cartridge, here described as 12", which could be the last of any number of cartridges connected in series to form the modular filter of the present invention, includes a open end 20" into which the end plate 38 is frictionally engaged by rotating the end plate 38 and cartridge 12' against one another to frictionally engage mating features 28", a J-shaped tab on the end plate 38 extending axially, with an L-shaped projection (not shown) extending circumferentially from the wall 16" of the cartridge 12". As noted before, preferably an o-ring 32" is inserted between the cartridge open end 20" and endplate 38 to provide a water tight seal. The endplate 38 may further include projections 42 which engage with the bottom of the support 26". These projections 42 provide a housing or encasement for the self-sealing valving and connectors of the present invention which will next be described.

Figure 5:
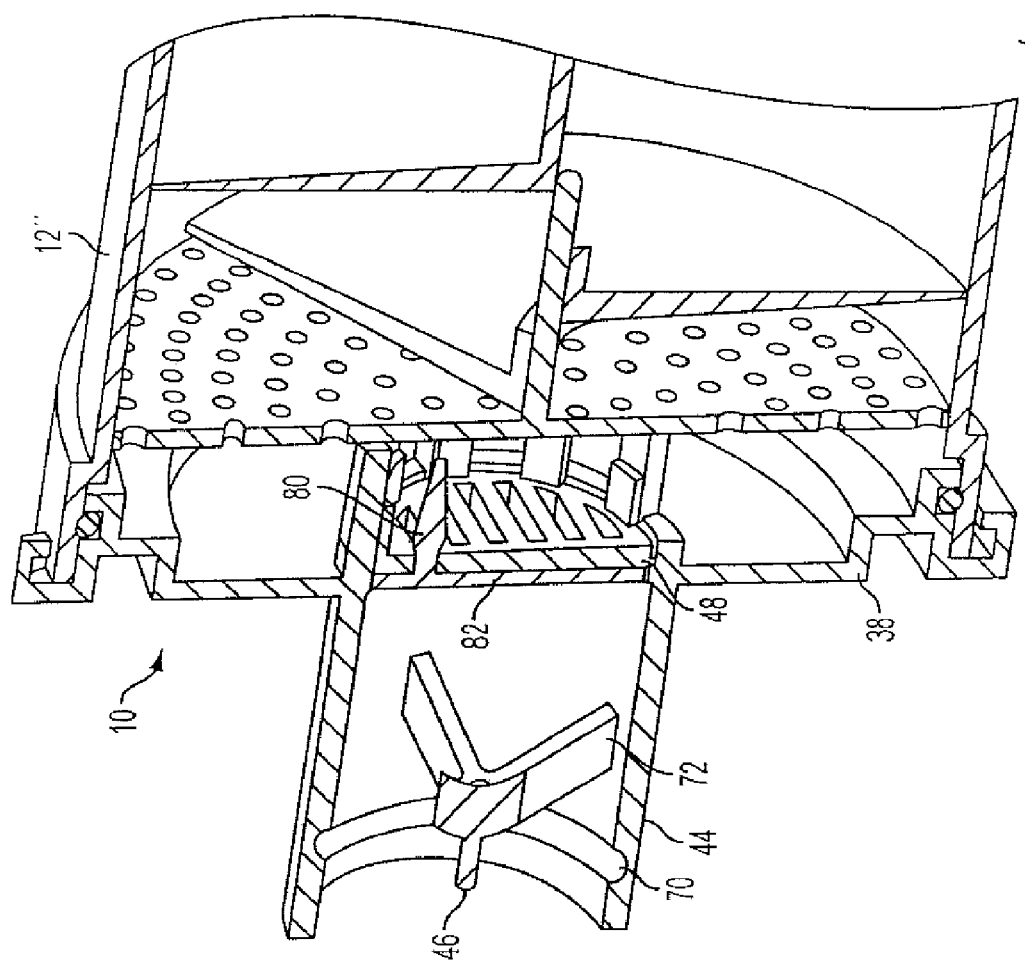
FIG. 5 is an enlarged sectional view of the bottom cartridge of the filter shown in FIG. 2 with the self-sealing valve disconnected.
Figure 5:
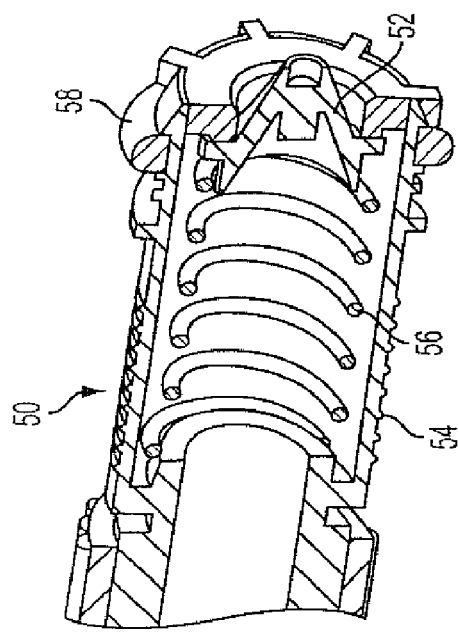

FIG. 5 illustrates a connector 50 at the bottom of the filter stack 10 which is ready to engage with the endplate 38. The endplate 38 includes an outlet 44, a valve activator 46, a valve seat 48 and a flexible seal 82. The flexible seal 82, preferably a resilient plastic molding of thermoplastic olefin, thermoplastic rubber, silicone or the like, is attached to the valve seat 48 by a tab 80 which extends through the grid-like structure of the seat 48. The tab 80 has a bulbous end which prevents easy removal once the end has been frictionally engaged in the grid. The grid covers the endplate outlet 44 and allows filtered water to pass through. When the filter 10 is connected to the aquarium and water is flowing through, via a pump for instance, the seal 82 is displaced off the seat 48 by the pressure from the pump (see FIG. 4). When the water flow is stopped by disconnecting connectors 50 and 60 (see FIGS. 1 and 5) the seal 82 flattens against the valve seat 44 due to a siphon or vacuum effect, preventing water from spilling out of the filter 10. Accordingly, it can be appreciated that the disengaged filter 10 illustrated in FIG. 2, when containing water, will not significantly leak water when outlet 44 is higher than inlet 18.

Now turning to the self-sealing connectors, FIG. 5 illustrates a connector 50 ready to be engaged to the outlet 44 of the endplate 38. The connector 50 includes a body 54, spring 56, gasket 58 and flow controller 52. In the extended position shown in FIG. 5, the spring 56 is pushing the flow controller 52 against the gasket 58 preventing any flow in or out of connector 50. Also shown in FIG. 5 is the valve actuator 48 located in outlet 44 ready to engage the flow controller 52 when the connector 50 is mated to the outlet 44, and a groove 70 for sealing against the outer periphery of the gasket 58. Optionally, one may surround the connector 50 and outlet 44 with a clamp or other structural component. The actuator 46 preferably comprises a post spaced from the inner surface of the outlet 44 by radial arms 72, extending and connecting the inner surface of the outlet 44, to allow free flow of water.

FIG. 4 illustrates the bottom connector 50 engaged with the outlet 44 to allow water to flow out of the cartridge 12" of filter 10. Note that the seal 82 is shown displaced from its seat 48 due to the flow of water out of the filter. Note also that gasket 58 has engaged groove 70 to provide a water-tight seal and that valve actuator 46 has engaged flow controller 52 compressing spring 56 and allowing water to flow between gasket 58 and flow controller 52.

Connector 60 at the inlet to cartridge 12 works in the same fashion. FIG. 3 shows the connector engaged with inlet 18. The radial arms 72 which support valve actuator 46 are evident inside inlet 18.

Thus a modular filter is provided which comprises one or more cylindrical cartridges, connected in series to carry out the filtration and water treatment (biological, chemical, and/or mechanical) for an aquarium.

The cartridges are frictionally engaged for rapid exchange. The ends of the filter engage self-sealing connectors which stop the flow of water when disconnected. Each cartridge contains a helical flow director to provide more efficient filtration and a perforated support for holding the media.

The description and drawings illustratively set forth the presently preferred invention embodiment. We intend the description and drawings to describe this embodiment and not to limit the scope of the invention. Obviously, it is possible to modify these embodiments while remaining within the scope of the following claims. Therefore, within the scope of the claims one may practice the invention otherwise than as the description and drawings specifically show and describe.

What is claimed is:

1. A modular aquarium filter comprising:
    a plurality of cartridges connected in series, each of said cartridges having a top end and a bottom end, each of said cartridges including an inlet at said top end;
    wherein the last in said series of cartridges engages an endplate including an outlet, wherein said bottom end of said filter is closed off by said endplate;
    wherein each of cartridges contains a helical flow director; and
    wherein at least one of said plurality of cartridges contains biological filtering media and another of said plurality of cartridges contains chemical or mechanical filtering media.

2. The filter of claim 1 wherein at least two of said cartridges include a perforated platform for supporting said filtering media.

3. The filter of claim 1, wherein said endplate is frictionally engaged.

4. The filter of claim 1, wherein said plurality of cartridges provide biological, chemical and/or mechanical treatment of aquarium water.

5. The filter of claim 1, wherein said plurality of cartridges, endplate, helical flow director and perforated support are molded of plastic.

6. The filter of claim 1, further including a first inlet connector and a second outlet connector for supplying aquarium water to and returning water from said filter, wherein said connectors are self-sealing.

7. The filter of claim 6 wherein said first and second connectors each include a spring, a gasket and a flow controller which provide a self-sealing connector.

8. The filter of claim 1, wherein said filter includes a self-sealing valve assembly which prevents substantial leakage of the filter when the filter is not connected to a water supply.

9. The filter of claim 1, wherein the helical flow director comprises a helix having a pitch, wherein the pitch is constant in each of said plurality of cartridges.

10. The filter of claim 9, wherein the pitch is different in any of said one or more cartridges in said filter.

11. The filter of claim 9, wherein the pitch of said helical flow director varies between the top and the bottom of any of said one or more cartridges.

12. A device for directing the flow of water through a filter, the filter including a plurality of housings connected in series, each housing including a first end and a second end, the filter further including an inlet at one end and an outlet at the other end, the device comprising:
    a helical flow director disposed in each of said housings, wherein the helical flow director comprises a coil of material disposed axially in spiral fashion from said first end of said housing to said second end of said housing to impart centrifugal force upon fluid passing from said filter inlet to said filter outlet;
    wherein at least one of said plurality of housings contains biological filtering media and another of said plurality of housings contains chemical or mechanical filtering media.

13. The device of claim 12, wherein said plurality of housings provide biological, chemical and and/or mechanical treatment of aquarium water.

14. The device of claim 12, further including a first inlet connector connected to said inlet and a second outlet connector connected to said outlet for supplying aquarium water to and returning water from said filter, wherein said connectors are self-sealing.

15. The device of claim 12, wherein the helical flow director comprises a helix having a pitch, and said pitch is constant in each of said one or more housings.

16. The device of claim 15, wherein the pitch is different in any of said one or more housings in said filter.

17. The device of claim 15, wherein the pitch of said helical flow director varies between said first and second end of any of said one or more housings.

18. A method of filtering aquarium water comprising the steps of:
    providing a plurality of cartridges connected in series, wherein each of said cartridges having a top end and a bottom end, each of said cartridges including an inlet at said top end;
    providing an endplate including an outlet wherein the last in said series of cartridges has a bottom end closed off by said endplate;
    wherein each of cartridges contains a helical flow director; and
    wherein at least one of said plurality of cartridges contains biological filtering media and another of said plurality of cartridges contains chemical or mechanical filtering media.

19. The method of claim 18, wherein the one or more cartridges provide biological, chemical and and/or mechanical treatment of aquarium water.

\* \* \* \* \*